Figure 1:
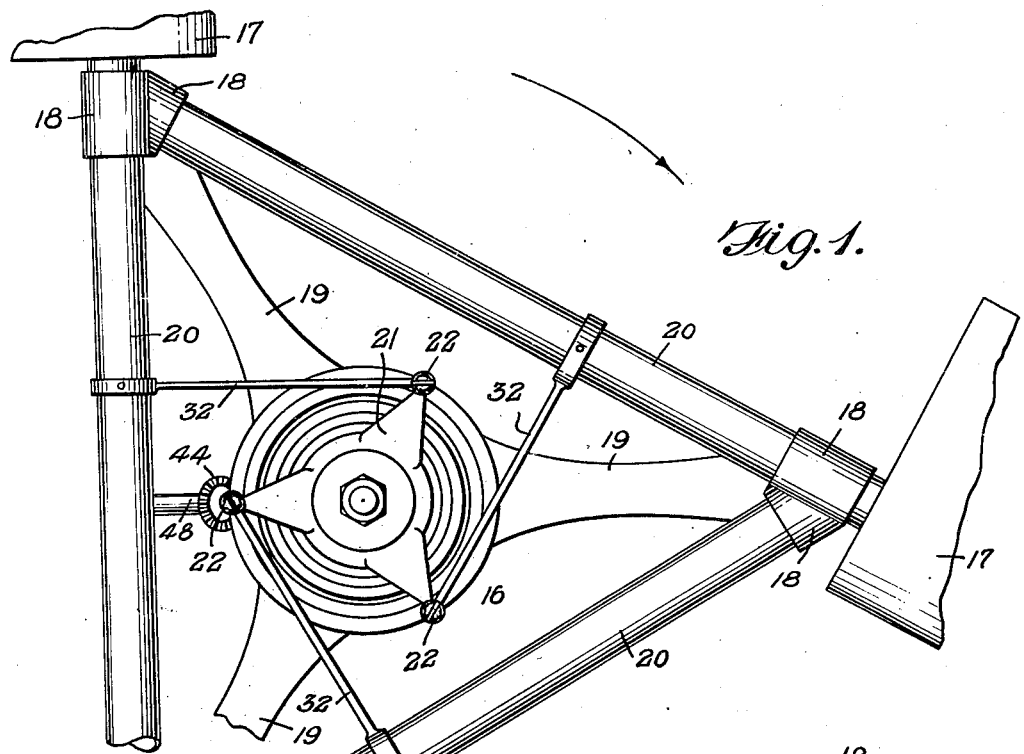

May 18, 1937.    E. B. WILFORD ET AL    2,080,522
GYRO ROTOR
Filed Sept. 18, 1936    2 Sheets-Sheet 1

INVENTOR.
E. Burke Wilford and
BY Elliot Daland
Max M. Munk
ATTORNEY.

May 18, 1937.  E. B. WILFORD ET AL  2,080,522
GYRO ROTOR
Filed Sept. 18, 1936   2 Sheets-Sheet 2

INVENTOR.
E. Burke Wilford
BY  Elliot Daland
ATTORNEY.

Patented May 18, 1937

2,080,522

UNITED STATES PATENT OFFICE 2,080,522

GYRO ROTOR

Edward Burke Wilford and Elliot Daland, Philadelphia, Pa.

Application September 18, 1936, Serial No. 101,516

2 Claims. (Cl. 244—18)

This invention relates to a gyro rotor, that is to a self rotating lifting member of an aircraft, having a plurality of blades fastened to a rotating hub. It is the object of the invention to provide for such rotor which possesses superior flying properties, which is directly controllable longitudinally and laterally, so that external and separate elevator and aileron means can be dispensed with, and which has a changeable lift creating capacity so that it may be adapted at all times to the needs of the particular maneuver then executed by the aircraft, preferably at the will and initiative of the pilot rather than automatically. Furthermore, to provide for a gyro rotor excelling other ones proposed for such purpose by the simplicity of its design, by its lighter weight, and by the greater ease of its control.

These advantages are obtained by restricting the motion of the blades to one plane of rotation in a fixed relation to the aircraft structure. The rotor hub can rotate about one fixed axis only; this axis cannot be tilted with respect to aircraft structure. The blades extend from the hub by way of cantilever support, they are not hinged at their root, and they are rotatable about one axis only, which extends substantially parallel to the blade extension, or radially, though not necessarily exactly radially. Control in two directions and variation of the total lift creating capacity is provided by suitable changes of the blade incidences relative to the hub. Independent means are provided for changing the mean or average incidence of all blades, and for changing the phase relation and amplitude of periodic incidence changes synchronous with the rotor revolutions and in polyphase time relation with respect to the several blades.

The principles employed in the structural design of the rotor contribute materially to obtaining the full benefit of the arrangement. Taking care of the large cantilever root moments of the blades requires at least two bearings for each on the hub, the bearing loads being opposite, one up and one down. These bearings should have the largest distance from each other consistent with a small hub structure, and two bearings with opposite load should be in close vicinity with each other, so that the transmission of large stresses between different points of the hub be restricted to short distances. The hub bearings are therefore arranged in pairs near the corners of a regular polygon. The blade axes depart slightly from the radial direction and occupy the sides of said polygon. This also provides advantageously space for the control mechanism.

These and other desirable objects and advantages of the present invention will be illustrated in the appended drawings and described in the specification, a certain preferred embodiment being disclosed by way of illustration only, for, since the underlying principles may be incorporated in other specific devices, it is not intended to be limited to the one here shown, except as such limitations are clearly imposed by the appended claims.

Figure 2:
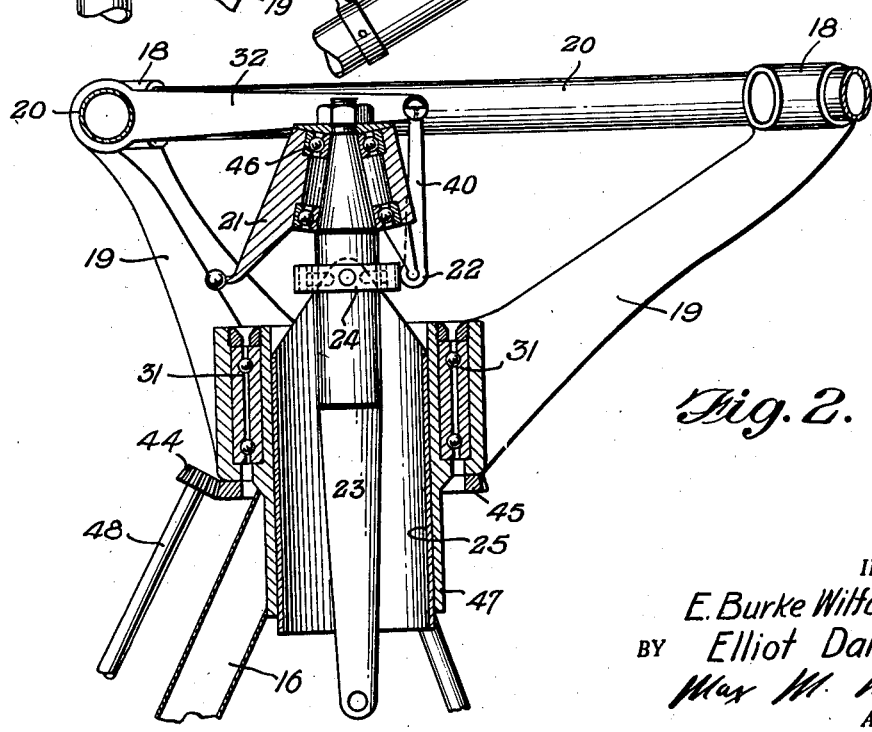
Figure 3:
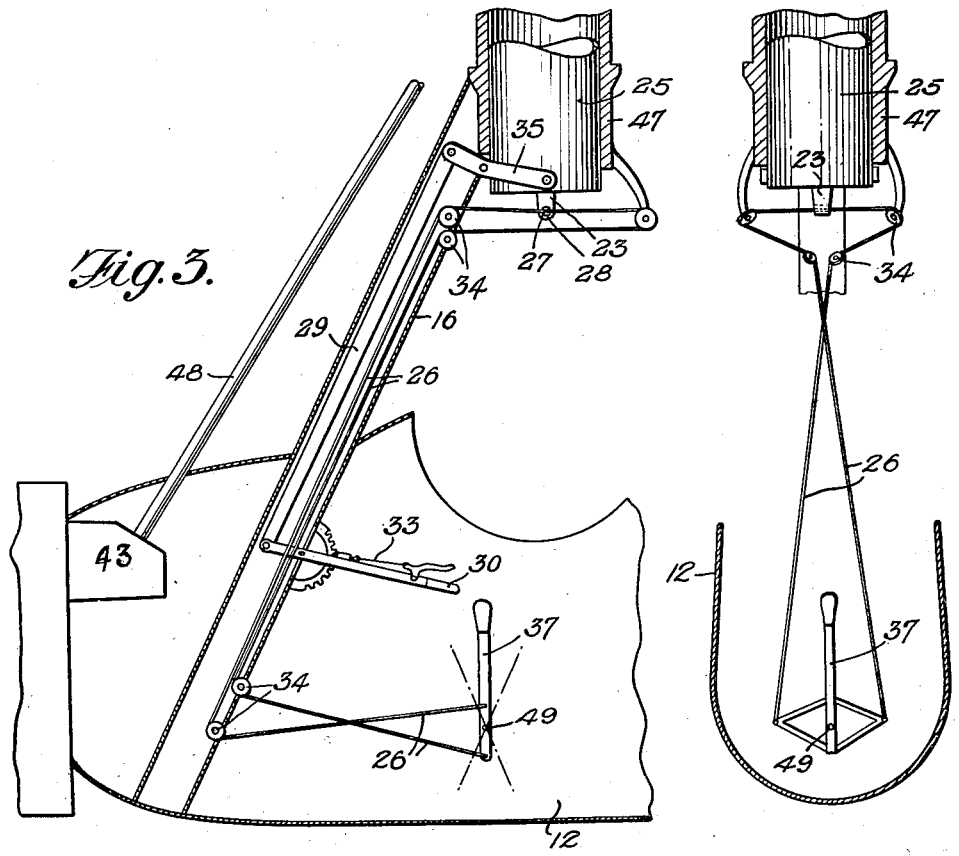
Figure 4:
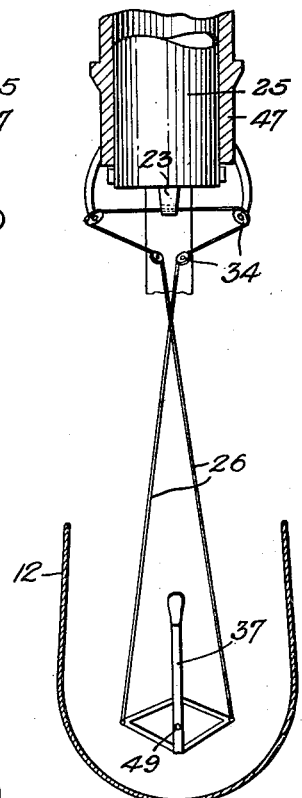
Figure 5:
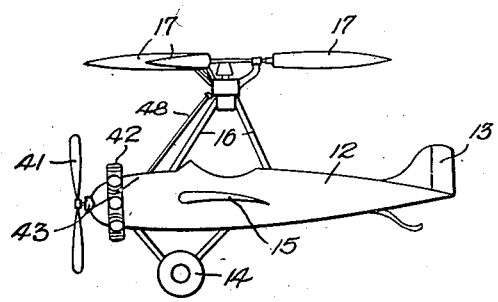

In the drawings, like numerals relate to similar parts throughout the several views, of which Fig. 1 represents the top view of a gyro rotor embodying the invention, Fig. 2 represents a vertical cross section through the same along the line 2—2, Fig. 3 shows schematically and in vertical view from the side of the aircraft the control system for the rotor, Fig. 4 shows the same seen in direction of flight, or from the rear of the aircraft, and Fig. 5 represents a side view of the entire aircraft incorporating the rotor represented in the other figures.

In Figs. 1 and 2 there is shown a set of three rotor blades 17 mounted rotatably in bearings 18 of a spider wheel 19, which latter is mounted rotatably, by means of ball bearing 31, on the mast structure 16 of fuselage 12. The axes of axles 20 of the blades are seen to form an equilateral triangle in symmetric relation to the axis of the ball bearing 31. The angular position of blades 17, or their angle of attack or incidence, is controlled by means of levers 32 fastened to axles 20, said levers being linked to a control spider 21, at the linkage points 22, by means of link rods 40. The control spider 21 is mounted freely rotatable, on a rotor lever 23 by means of ball bearing 46, which lever 23 is mounted by means of the universal joint 24 on sleeve 25, the latter being slidably mounted in collar 47 of the mast structure 16. Hence, lever 23, and with it spider 21 freely rotatably mounted thereon, is tiltable by virtue of the universal joint 24 and shiftable by virtue of sleeve and collar 25 and 47, which two independent motions are transmitted to the blades 17 by direct linkage 32 and 40 by way of determining their incidence, namely the angle of attack between the chord of the blade section and the plane of the rotor rotation.

Turning now to Figs. 3 and 4, there are represented control stick 37 and control lever 30, both in the cockpit of the fuselage 12, and in convenient reach of the pilot. Lever 30 is shown held in position by locking device 33 while out of use, while stick 37 is never locked but corresponds to the conventional control stick of airplanes. Like the latter, it is universally mounted in the cockpit, at the point 49. A pair of cable loops, 26, guided by a suitable pulley system 34, transmit the motion of stick 37 to the lower end of lever 23. The motion of lever 30 is transmitted to sleeve 25 by means of connecting rod 29 and lever 32 so that a manipulation of lever 30 results in a shifting of sleeve 25.

The kinematic effect of any motion or manipulation of control elements 37 and 30 on the character of the motion of the blades 17 is as follows. Stick 37 tilts control spider 21 without shifting it. Hence, this does not change the average incidence of all blades, but it controls the phase and amplitude of the periodic change of their incidence. Controlled by the position of stick 37, the blades change their incidence periodically in such a manner that the maximum incidence of each blade is assumed each time when the linkage point 22 has reached the highest point of its course, and the minimum when it has reached the lowest point. It is thus seen that stick 37 governs a periodic change of the incidence of each blade, so that different blades in general have different incidences at the same time. The angular orientation of the points of maximum incidence of the blades is dependent on and governed by the direction in which stick 37 is tilted. It is preferred to have the transmitting means so arranged that the maximum incidence of the blades is assumed in a direction about 40 degrees from the direction to which the stick 37 is tilted, so that the aerodynamic moment set up by the use of the stick and set up by the expected rotor tilting by way of gyroscopic moment may be in the conventional relation to the stick motion. Lever 30 determines the average incidence of all blades, this incidence depending on the vertical position of the spider 21 to which it may be shifted. The average incidence changes only while lever 30 is being manipulated, but after lever 30 has been locked again, the average incidence remains constant. Both control elements, 30 and 37, manipulated in unison, of course, give rise to a composite blade motion comprising change of average incidence and change of periodic incidence variation. It must be clearly understood that the kinematic features attributed to the two control elements 30 and 37 separately are only components of the complete motion, not the complete motion itself.

In addition to the above described novel parts, the aircraft contains the parts usually employed in devices of this kind. The fuselage 12 is provided with a landing gear 14, a vertical fin and controllable rudder unit 13, an internal combustion engine 42, a propeller 41, an auxiliary drive of the spider wheel 19 comprising a gear rim 45, a gear wheel 44 in mesh with rim 45, a shaft 48 driven by engine 42 and driving gear 44, a clutch 43 between said shaft 48 and the engine 42, and further an auxiliary pair of wings 15.

The aircraft is operated as follows. When it is intended to begin a flight, the engine is started, the incidence of blades 17 set low by means of lever 30, and the spider 19 is set rotating by means of gears 44 and 45 up to a speed in excess of that employed in ordinary flight. Stick 37 is held in "neutral", so that no periodic changes of the rotor blade variation occur. Gears 44 and 45 are now disengaged, and the pitch or incidence of the rotor blades 17 is increased by the manipulation of lever 30. In consequence, a lift is suddenly created, and the aircraft soars up suddenly and substantially vertically, receiving the energy needed therefor from the spider and the blade system acting as a flywheel and dispensing kinetic energy while diminishing their speed of revolution. When the speed is diminished to that necessary for keeping the aircraft aloft, the propeller is clutched in, and ordinary flight is assumed, using the stick and rudder for control in the conventional manner.

It is contemplated that during ordinary flight lever 30 is only sparingly used, and only for adapting the aircraft to very different conditions of flight during extended periods. When landing, lever 30 may be used for quickly destroying the rotor lift, by decreasing the average blade incidence.

We claim:

1. A gyro rotor comprising a plurality of blades, shafts, constituting each the inner end of one of said blades and occupying the sides of a regular polygon, control levers on said shafts, pairs of co-axial bearings supporting said shafts and positioned adjacent the corners of said polygon, and a movably mounted control element in symmetric relation to said polygon and in operative connection to said levers.

2. A gyro rotor comprising a plurality of blades, shafts, constituting each the inner end of one of said blades and occupying the sides of a regular polygon, control levers on said shafts extending towards the inside of said polygon, pairs of co-axial bearings supporting said shafts and positioned adjacent the corners of said polygon, and a movably mounted control element in symmetric relation to said polygon and in operative connection with said levers.

E. BURKE WILFORD.
ELLIOT DALAND.